Figure 3:
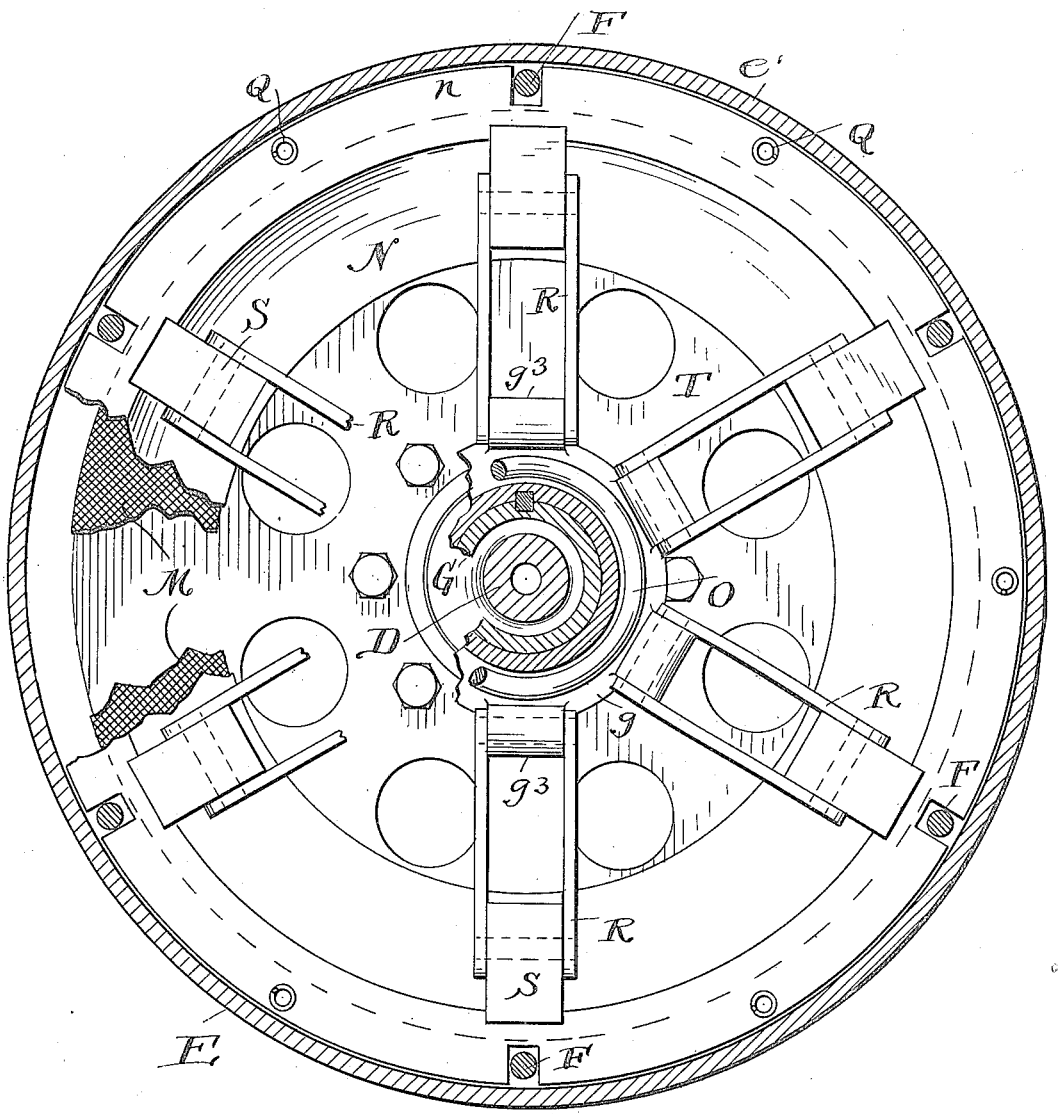

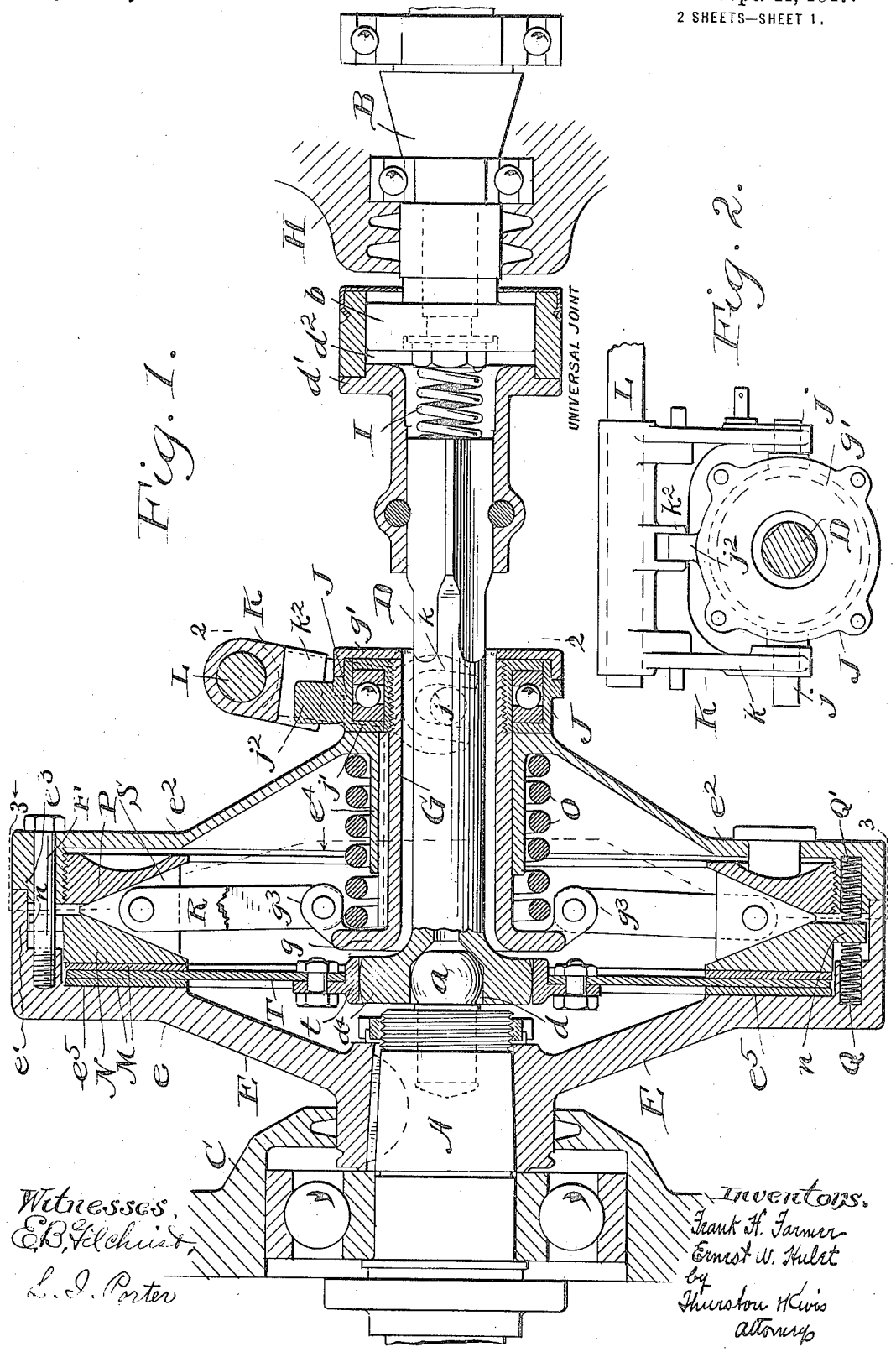

UNITED STATES PATENT OFFICE.

FRANK H. FARMER AND ERNEST W. HULET, OF CLEVELAND, OHIO, ASSIGNORS, BY MESNE ASSIGNMENTS, TO THE WHITE MOTOR COMPANY, OF CLEVELAND, OHIO, A CORPORATION OF OHIO.

FRICTION-CLUTCH.

1,239,778. Specification of Letters Patent. Patented Sept. 11, 1917.

Application filed October 31, 1913. Serial No. 798,405.

*To all whom it may concern:*

Be it known that we, FRANK H. FARMER and ERNEST W. HULET, citizens of the United States, and residents, respectively, of Cleveland, in the county of Cuyahoga and State of Ohio, and Cleveland, in the county of Cuyahoga and State of Ohio, have invented a certain new and useful Improvement in Friction-Clutches, of which the following is a full, clear, and exact description.

This invention is particularly adapted for use on automobiles whereon the engine and its crank case, on the one hand, and the transmission gear case, on the other hand, are independently connected with the chassis frame. In such construction, the parts referred to are connected so that the engine crank shaft and the power receiving shaft of the transmission gearing are in substantial alinement when the automobile is standing on a level surface; but, in use, the chassis frame is deflected and twisted in various directions, and therefore these two shafts are repeatedly disalined, and are caused to take, temporarily, many different positions relative to one another.

Some form of clutch mechanism is and always must be interposed between the two shafts in order that power may or may not be transmitted from the crank shaft to the transmission shaft at the will of the operator. The present invention is an improved and novel clutch mechanism adapted to occupy this intermediate position, and to efficiently serve the stated purposes under all the varying conditions of practical use.

Although the invention is especially designed for the particular use referred to, it will be found to be useful with any mechanism which includes two shafts which cannot be held permanently in alinement, and which it is desired to connect and disconnect at will. Additionally, some of the novel features of the construction are such that clutch mechanism either in the precise form shown or in some modified form which embodies features of novelty covered by the claims, may be found practically useful as the means for connecting or disconnecting shafts which remain permanently alined.

The invention consists in the construction and combination of parts hereinafter described and pointed out definitely in the appended claims.

In the drawing, Figure 1 is a longitudinal central section of the invention. Fig. 2 is a sectional view in the plane indicated by line 2—2 on Fig. 1. Fig. 3 is a sectional view in the plane indicated by the bent line 3—3 on Fig. 1.

Referring to the parts by letters, A represents the crank shaft of the engine; and C a part of the crank case in which said shaft is rotatably mounted. B represents the driven shaft of this invention, which may be the power receiving shaft of the transmission gearing. H represents a part of the crank case in which the shaft B is rotatably mounted.

D represents the clutch shaft which is supported at its ends only, by the two shafts A and B, between which it lies,—the supporting means being well known forms of universal or ball and socket joints. As shown, the crank shaft carries a ball $a$, and the clutch shaft D has a concentric socket $d$ which embraces it. At the other end of the clutch shaft, a piece $d^1$ is fixed to it, and this has a square socket $d^2$. A square piece $b$ fixed to the end of shaft B projects into and loosely fits in the said square socket. These universal joint connections, as shown, are such that the clutch shaft at one end is supported by, but has a non-driving connection with the shaft A, while the other end of the clutch shaft is supported by and has a driving connection with the shaft B. A coil spring I in the socket $d^2$ thrusts against the ends of the two shafts B and D, and thereby holds the latter shaft in the described engagement with the ball $a$.

A housing E, which functions as a fly wheel, is keyed to the crank shaft A, and overhangs the clutch shaft D. It is composed of two parts, to wit; the slightly conical disk-like member $e$ having at its outer periphery the cylindrical flange $e^1$; and a second reversely conical disk-like member $e^2$ having also the cylindrical flange $e^3$. These two cylindrical flanges project toward each other and engage, and the two members of the housing are connected together by bolts F. The space within the housing incloses most of the clutch mechanism. The housing member $e^2$ is provided with an integral tubular hub $e^4$ which projects toward the other housing member, and surrounds but lies wholly out of contact with the clutch shaft. Within this hub the shifting sleeve G of the clutch mechanism is mounted so as to be supported thereby. It has a tongue and groove connection with the hub, wherefore the two must rotate together; but the sleeve is permitted to move independently lengthwise of the shafts. The sleeve G projects beyond both ends of the hub. Outside of the housing a collar J is mounted on the clutch sleeve; and the sleeve carries a flange $g^1$ to receive the outward thrust of this collar. The collar has an inwardly directed flange $j^1$, which, together with the sleeve and pressure flange $g^1$, forms a housing which contains anti-friction thrust bearings. This sleeve J has laterally projecting trunnions $j$ which receive the forked end $k$ of the forked lever K. This is fixed to a rock shaft L. By the rocking of this rock shaft, the sleeve G may be moved outward by means of the described connection between them. The collar J is prevented from rotating by means of a finger $j^2$ which enters a forked arm $K^2$ fixed to the rock shaft L. The sleeve G is moved inward by means of a coil spring O which surrounds the hub $e^4$ and sleeve G and exerts constant endwise pressure against the disk $e^2$ and against the flange $g$ on the inner end of the sleeve G.

On the inner face of the housing disk $e$ is a clutch surface $e^5$. Within the housing is a longitudinally movable annular pressure member N, one face of which is parallel with the surface $e^5$. The opposite surface of this pressure member is inclined as shown. Flanges $n$ on this pressure member are forked and embrace the bolts F, wherefore the pressure member and housing must rotate in unison, but the pressure member is allowed to move longitudinally within the housing. P represents the fixed pressure member. This is a ring which is adjustably screwed into the flange $e^3$ of the housing, and it has an inclined inner surface which is opposed to the inclined surface of the movable pressure member N. A plurality of wedges S are fitted in the V-shaped space between the inclined surfaces of these two pressure members; and these wedges S are connected by links R with ears $g^3$ on the clutch operating sleeve G. T represents the driven friction disk whose outer edge lies between the movable pressure member N and the surface $e^5$ on the housing. Preferably also two annular disks M, M, which may be made of raybestos lie on opposite sides of this disk, and between it and the surface $e^5$ and the opposite surface of the pressure member N. The hub $t$ of this friction disk T has a square hole in it which fits somewhat loosely on the squared end $d^4$ of shaft D. There is therefore a driving connection between the disk T and this shaft, but this connection is such that the disk may have a slight universal movement relative to the shaft so as to accommodate itself to such conditions as will exist, as when shaft D becomes disalined with shaft A.

When the clutch is to be set the shaft L is allowed to rock and the spring O is allowed to move the clutch sleeve G inward, and thereby to drive the wedges S outward. This causes such a longitudinal movement of the pressure ring N as will cause the disk T to be tightly clamped between the two pressure rings M, M. When it is desired to release the clutch the rock shaft L is properly rocked, thereby drawing the sleeve G outward and drawing wedges S toward the axis of the shaft, which permits the pressure ring N to move in the releasing direction. It is so moved by means of a plurality of springs Q supported by the housing and acting against flange $n$ on said pressure member.

Springs $Q^1$ act in the opposite direction upon the ears $n$ of the pressure member N, and therefore serve to limit the extent of the movement of said pressure member which can be produced by the springs Q.

From the foregoing it will appear clearly that the efficiency of the clutch is not dependent upon the preservation of the alinement of the driving shaft A and the driven shaft B. They may become disalined to any extent which will occur in practical use, and the shaft D may take a position in accordance with such disalinement. As it does change its position, it does not necessarily change the position of the friction disk T, nor does said disk interfere with any required movement of the shaft D.

Having described our invention, what we claim is:

1. The combination with two alined shafts, viz: a driving shaft and a driven shaft, and an intermediate clutch shaft which is directly supported at one end by a ball and socket non-driving connection with the driving shaft and is supported at its other end by a universal joint driving connection with the driven shaft, a housing fixed to the driving shaft and overhanging the clutch shaft, which housing is provided with a sleeve which surrounds but does not contact with said clutch shaft, two thrust members within said housing having oppositely beveled surfaces, one of said thrust members being adjustably fixed to the housing and the other having a sliding non-rotative connection therewith, a driving disk which has a driving connection with the clutch shaft and which projects between a part of the housing and the sliding thrust member whereby it may be clamped between them, a plurality of expansible coiled springs which are located between the housing and movable thrust member and exert their force to move the latter toward the fixed thrust member, wedges located between the fixed and movable thrust members and adapted to engage the beveled surfaces of said thrust members, a clutch actuating sleeve which extends through the sleeve of the housing and is supported thereby and has a tongue and groove connection therewith, links which are wholly within the housing and are connected with said wedges, and with that end of the clutch sleeve which extends into the housing, a spring which lies wholly within the housing and acts to move said sleeve in the clutch setting direction, and means engaging the projecting outer end of said sleeve for moving said sleeve in the contrary direction.

2. In mechanism of the character described, the combination of a driving shaft, a driven shaft, an intermediate clutch shaft which is directly supported at one end by a ball and socket non-driving connection with the driving shaft, and is supported at its other end by a universal joint driving connection with the driven shaft, a housing fixed to the driving shaft and overhanging the clutch shaft and having an internal clutch surface, an annular pressure member movable longitudinally within the housing and having a driving connection with the housing, a fixed pressure member in the housing adjustably connected therewith, the said two pressure members having oppositely inclined opposed surfaces, a series of wedges lying between said pressure members and engaging the inclined surfaces thereof, a friction disk having a driving connection with the clutch shaft and extending between said movable pressure member and the clutch surface on the housing, a clutch operating sleeve wholly supported by the housing and movable longitudinally thereon and projecting at one end into the housing and at the other end outside of the housing, links connecting the projecting inner end of said sleeve with the wedges, and means outside of the housing for moving said sleeve.

3. In mechanism of the character described, the combination of a driving shaft, a driven shaft, an intermediate clutch shaft, a housing fixed to the driving shaft and overhanging the clutch shaft, said housing having a tubular hub which embraces but does not contact with said clutch shaft, and an internal clutch surface, a movable pressure member within the housing having a driving connection therewith but capable of longitudinal movement, a friction disk lying between said clutch surface and said pressure member, said disk being provided with a hub which has a loose driving connection with the clutch shaft, a clutch sleeve which embraces the clutch shaft, but is supported by and is longitudinally movable in said tubular hub of the housing, means operable by the sleeve for moving said pressure member toward the clutch surface on the housing, and a series of springs supported by the housing engaging said pressure member to move it in the contrary direction.

4. In mechanism of the character described, the combination of a driving shaft, a driven shaft, an intermediate clutch shaft which is directly supported at one end by a ball and socket non-driving connection with the driving shaft and is supported at its other end by a universal joint driving connection with the driven shaft, a housing fixed to the driving shaft and overhanging the clutch shaft and having an internal clutch surface, an annular pressure member movable longitudinally within the housing and having a driving connection with the housing, a fixed pressure member in the housing adjustably connected therewith, the said two pressure members having oppositely inclined opposed surfaces, a series of wedges lying between said pressure members and engaging the inclined surfaces thereof, a friction disk having a loose driving connection with the clutch shaft and extending between said movable pressure member and the clutch surface on the housing, a clutch operating sleeve wholly supported by the housing and movable longitudinally thereon and projecting at one end into the housing and at the other end outside of the housing, links connecting the projecting inner end of said sleeve with the wedges, means outside of the housing for moving said sleeve in one direction, a spring for moving the said sleeve in the opposite direction, and a series of springs carried by the housing and engaging the movable pressure member and acting to move it toward the fixed pressure member.

In testimony whereof, we hereunto affix our signatures in the presence of two witnesses.

FRANK H. FARMER.
ERNEST W. HULET.

Witnesses:
  THEODORE R. DAHL,
  JOSEPHINE M. MAHON.